(12) United States Patent
Reed

(10) Patent No.: US 8,629,621 B2
(45) Date of Patent: Jan. 14, 2014

(54) RESONANT NETWORK FOR REDUCTION OF FLICKER PERCEPTION IN SOLID STATE LIGHTING SYSTEMS

(75) Inventor: William G. Reed, Seattle, WA (US)

(73) Assignee: Express Imaging Systems, LLC, Seattle, WA (US)

( * ) Notice: Subject to any disclaimer, the term of this patent is extended or adjusted under 35 U.S.C. 154(b) by 0 days.

(21) Appl. No.: 13/592,590

(22) Filed: Aug. 23, 2012

(65) Prior Publication Data

US 2013/0049613 A1 Feb. 28, 2013

Related U.S. Application Data

(60) Provisional application No. 61/527,029, filed on Aug. 24, 2011.

(51) Int. Cl.
*H05B 37/02* (2006.01)
(52) U.S. Cl.
USPC ........................ 315/185 R; 315/228; 315/312
(58) Field of Classification Search
USPC .......... 315/185 R, 258, 201, 228, 232, 241 R, 315/244, 294, 297, 307, 312
See application file for complete search history.

(56) References Cited

U.S. PATENT DOCUMENTS

| | | |
|---|---|---|
| 4,153,927 A | 5/1979 | Owens |
| 4,237,377 A | 12/1980 | Sansum |
| 5,086,379 A | 2/1992 | Denison et al. |
| 5,160,202 A | 11/1992 | Légaré |
| 5,230,556 A | 7/1993 | Canty et al. |
| 5,343,121 A | 8/1994 | Terman et al. |
| 5,349,505 A | 9/1994 | Poppenheimer |
| 5,450,302 A | 9/1995 | Maase et al. |
| 5,589,741 A | 12/1996 | Terman et al. |
| 6,111,739 A | 8/2000 | Wu et al. |
| 6,612,720 B1 | 9/2003 | Beadle |
| 6,753,842 B1 | 6/2004 | Williams et al. |
| 6,902,292 B2 | 6/2005 | Lai |
| 7,066,622 B2 | 6/2006 | Alessio |
| 7,122,976 B1 | 10/2006 | Null et al. |
| 7,188,967 B2 | 3/2007 | Dalton et al. |
| 7,196,477 B2 | 3/2007 | Richmond |
| 7,239,087 B2 | 7/2007 | Ball |
| 7,252,385 B2 | 8/2007 | Engle et al. |

(Continued)

FOREIGN PATENT DOCUMENTS

| | | |
|---|---|---|
| DE | 4001980 A1 | 8/1990 |
| EP | 1 734 795 A1 | 12/2006 |

(Continued)

OTHER PUBLICATIONS

International Search Report, mailed Sep. 30, 2011 for PCT/US2011/021359, 3 pages.

(Continued)

*Primary Examiner* — Daniel D Chang
(74) *Attorney, Agent, or Firm* — Seed IP Law Group PLLC

(57) ABSTRACT

An apparatus and method for reducing the perception of flicker of solid state light sources. An alternating current (AC) signal is passed through an AC conditioning circuit and a passive resonating circuit before being supplied to a string of solid state light sources, such as light emitting diodes.

34 Claims, 8 Drawing Sheets

(56) References Cited

U.S. PATENT DOCUMENTS

| | | | |
|---|---|---|---|
| 7,281,820 B2 | 10/2007 | Bayat et al. | |
| 7,314,291 B2 | 1/2008 | Tain et al. | |
| 7,317,403 B2 | 1/2008 | Grootes et al. | |
| 7,322,714 B2 | 1/2008 | Barnett et al. | |
| 7,339,323 B2 | 3/2008 | Bucur | |
| 7,339,471 B1 | 3/2008 | Chan et al. | |
| 7,405,524 B2 | 7/2008 | Null et al. | |
| 7,438,440 B2 | 10/2008 | Dorogi | |
| 7,524,089 B2 | 4/2009 | Park | |
| 7,538,499 B2 | 5/2009 | Ashdown | |
| 7,578,596 B2 | 8/2009 | Martin | |
| 7,578,597 B2 | 8/2009 | Hoover et al. | |
| 7,631,324 B2 | 12/2009 | Buonasera et al. | |
| 7,633,463 B2 | 12/2009 | Negru | |
| 7,677,753 B1 | 3/2010 | Wills | |
| 7,688,222 B2 | 3/2010 | Peddie et al. | |
| 7,703,951 B2 | 4/2010 | Piepgras et al. | |
| 7,804,200 B2 | 9/2010 | Flaherty | |
| 7,834,922 B2 | 11/2010 | Kurane | |
| 7,932,535 B2 | 4/2011 | Mahalingam et al. | |
| 7,940,191 B2 | 5/2011 | Hierzer | |
| 7,952,609 B2 | 5/2011 | Simerly et al. | |
| 7,960,919 B2 | 6/2011 | Furukawa | |
| 7,985,005 B2 | 7/2011 | Alexander et al. | |
| 8,100,552 B2 | 1/2012 | Spero | |
| 8,118,456 B2 | 2/2012 | Reed et al. | |
| 8,143,769 B2 | 3/2012 | Li | |
| 2002/0113192 A1 | 8/2002 | Antila | |
| 2004/0095772 A1 | 5/2004 | Hoover et al. | |
| 2004/0105264 A1 | 6/2004 | Spero | |
| 2004/0120148 A1 | 6/2004 | Morris et al. | |
| 2004/0192227 A1 | 9/2004 | Beach et al. | |
| 2004/0201992 A1 | 10/2004 | Dalton et al. | |
| 2005/0099802 A1 | 5/2005 | Lai | |
| 2005/0135101 A1 | 6/2005 | Richmond | |
| 2005/0174780 A1 | 8/2005 | Park | |
| 2005/0243022 A1 | 11/2005 | Negru | |
| 2005/0254013 A1 | 11/2005 | Engle et al. | |
| 2006/0001384 A1 | 1/2006 | Tain et al. | |
| 2006/0014118 A1 | 1/2006 | Utama | |
| 2006/0034075 A1 | 2/2006 | Alessio | |
| 2006/0066264 A1 | 3/2006 | Ishigaki et al. | |
| 2006/0158130 A1 | 7/2006 | Furukawa | |
| 2006/0202914 A1 | 9/2006 | Ashdown | |
| 2006/0262544 A1 | 11/2006 | Piepgras et al. | |
| 2006/0277823 A1 | 12/2006 | Barnett et al. | |
| 2007/0096118 A1 | 5/2007 | Mahalingam et al. | |
| 2007/0102033 A1 | 5/2007 | Petrocy | |
| 2007/0159819 A1 | 7/2007 | Bayat et al. | |
| 2007/0247853 A1 | 10/2007 | Dorogi | |
| 2007/0279921 A1 | 12/2007 | Alexander et al. | |
| 2008/0018261 A1 | 1/2008 | Kastner | |
| 2008/0043106 A1 | 2/2008 | Hassapis et al. | |
| 2008/0130304 A1 | 6/2008 | Rash et al. | |
| 2008/0266839 A1 | 10/2008 | Claypool et al. | |
| 2008/0271065 A1 | 10/2008 | Buonasera et al. | |
| 2008/0291661 A1 | 11/2008 | Martin | |
| 2009/0160358 A1 | 6/2009 | Leiderman | |
| 2009/0161356 A1 | 6/2009 | Negley et al. | |
| 2009/0167203 A1 | 7/2009 | Dahlman et al. | |
| 2009/0261735 A1 | 10/2009 | Sibalich et al. | |
| 2009/0278474 A1 | 11/2009 | Reed et al. | |
| 2009/0278479 A1 | 11/2009 | Platner et al. | |
| 2009/0284155 A1 | 11/2009 | Reed et al. | |
| 2010/0052557 A1 | 3/2010 | Van Der Veen et al. | |
| 2010/0060130 A1 | 3/2010 | Li | |
| 2010/0090577 A1 | 4/2010 | Reed et al. | |
| 2010/0123403 A1 | 5/2010 | Reed | |
| 2010/0259193 A1 | 10/2010 | Umezawa et al. | |
| 2010/0277082 A1 | 11/2010 | Reed et al. | |
| 2010/0295454 A1 | 11/2010 | Reed | |
| 2010/0295455 A1 | 11/2010 | Reed | |
| 2010/0295946 A1 | 11/2010 | Reed et al. | |
| 2011/0001626 A1 | 1/2011 | Yip et al. | |
| 2011/0006703 A1* | 1/2011 | Wu et al. | 315/294 |
| 2011/0026264 A1 | 2/2011 | Reed et al. | |
| 2011/0175518 A1 | 7/2011 | Reed et al. | |
| 2011/0221346 A1* | 9/2011 | Lee et al. | 315/122 |
| 2011/0310605 A1 | 12/2011 | Renn et al. | |
| 2013/0049613 A1* | 2/2013 | Reed | 315/185 R |
| 2013/0141000 A1* | 6/2013 | Wei et al. | 315/205 |

FOREIGN PATENT DOCUMENTS

| | | |
|---|---|---|
| FR | 2 883 306 A1 | 9/2006 |
| JP | 6-335241 A | 12/1994 |
| JP | 2001-333420 A | 11/2001 |
| JP | 2004-349065 A | 12/2004 |
| JP | 2006-244711 A | 9/2006 |
| KR | 2005078403 A | 8/2005 |
| WO | 02/076068 A1 | 9/2002 |
| WO | 03/056882 A1 | 7/2003 |
| WO | 2006/057866 A2 | 6/2006 |
| WO | 2007/0365873 A2 | 4/2007 |
| WO | 2008/030450 A2 | 3/2008 |
| WO | 2009/040703 A2 | 4/2009 |

OTHER PUBLICATIONS

International Search Report, mailed Jan. 14, 2013 for PCT/US2012/052009, 3 pages.
International Search Report, mailed Feb. 27, 2013 for PCT/US2012/065476, 3 pages.
Reed et al., "Systems and Methods That Employ Object Recognition," U.S. Appl. No. 13/411,321, filed Mar. 2, 2012, 51 pages.
Reed, "Electrostatic Discharge Protection for Luminaire," Office Action mailed Mar. 15, 2013 for U.S. Appl. No. 13/212,074, 11 pages.
Renesas Electronics, "Zener Diodes for Surge Absorption—Applications of high-intensity LED," Apr. 2010, 1 page.
Tyco Electronics, "Circuit Protection," retrieved Jun. 10, 2011, retrieved from http://www.tycoelectronics.com/en/products/circuit-protection.html, 2 pages.
Written Opinion, mailed Sep. 30, 2011 for PCT/US2011/021359, 4 pages.
Written Opinion, mailed Jan. 14, 2013 for PCT/US2012/052009, 5 pages.
Written Opinion, mailed Feb. 27, 2013 for PCT/US2012/065476, 8 pages.
EE Herald, "Devices to protect High brightness LED from ESD," dated Mar. 16, 2009, retrieved Jun. 10, 2011, retrieved from http://www.eeherald.com/section/new-products/np100779.html, 1 page.
"LCD Backlight I/O Ports and Power Protection Circuit Design," dated May 2, 2011, retrieved Jun. 10, 2011, retrieved from http://www.chipoy.info/gadgets/lcd-backlight-i-o-ports-and-powerpr..., 4 pages.
International Search Report, mailed Dec. 13, 2010 for PCT/US2010/035649, 3 pages.
International Search Report, mailed Dec. 15, 2010 for PCT/US2010/035658, 3 pages.
International Search Report, mailed Dec. 28, 2010 for PCT/US2010/035651, 3 pages.
International Search Report, mailed Jul. 9, 2009 for PCT/US2009/043171, 3 pages.
International Search Report, mailed Jun. 21, 2010 for PCT/US2009/064625, 3 pages.
International Search Report, mailed Oct. 8, 2012 for PCT/US2012/033059, 3 pages.
Littelfuse, "Application Note: Protecting LEDs in Product Designs," 2009, 2 pages.
Panasonic Electronic Components, "LED Lighting Solutions," 2009, 6 pages.
Reed et al., "Apparatus and Method for Schedule Based Operation of a Luminaire" U.S. Appl. No. 13/604,327, filed Sep. 5, 2012, 44 pages.
Reed et al., "Apparatus and Method of Operating a Luminaire," U.S. Appl. No. 13/558,191, filed Jul. 25, 2012, 84 pages.
Reed et al., "Apparatus, Method to Enhance Color Contrast in Phosphor-Based Solid State Lights," U.S. Appl. No. 61/534,722, filed Sep. 14, 2011, 53 pages.

(56) References Cited

OTHER PUBLICATIONS

Reed et al., "Gas-Discharge Lamp Replacement," U.S. Appl. No. 61/052,924, filed May 13, 2008, 32 pages.

Reed et al., "Low-Profile Pathway Illumination System," Amendment filed Jul. 29, 2011, for U.S. Appl. No. 12/437,472, 19 pages.

Reed et al., "Low-Profile Pathway Illumination System," U.S. Appl. No. 61/051,619, filed May 8, 2008, 25 pages.

Reed et al., "Low-Profile Pathway Illumination System," Notice of Allowance, dated Oct. 14, 2011, for U.S. Appl. No. 12/437,472, 9 pages.

Reed et al., "Low-Profile Pathway Illumination System," Office Action, dated May 5, 2011, for U.S. Appl. No. 12/437,472, 24 pages.

Reed et al., "Apparatus, Method to Change Light Source Color Temperature With Reduced Optical Filtering Losses," U.S. Appl. No. 61/295,519, filed Jan. 15, 2010, 35 pages.

Reed et al., "Apparatus, Method to Change Light Source Color Temperature With Reduced Optical Filtering Losses," U.S. Appl. No. 61/406,490, filed Oct. 25, 2010, 46 pages.

Reed et al., "Electrically Isolated Heat Sink for Solid-State Light," U.S. Appl. No. 61/229,435, filed Jul. 29, 2009, 29 pages.

Reed et al., "Gas-Discharge Lamp Replacement With Passive Cooling," U.S. Appl. No. 61/174,913, filed May 1, 2009, 29 pages.

Reed et al., "Long-Range Motion Detection for Illumination Control," U.S. Appl. No. 61/180,017, filed May 20, 2009, 32 pages.

Reed et al., "Turbulent Flow Cooling for Electronic Ballast," U.S. Appl. No. 61/088,651, filed Aug. 13, 2008, 23 pages.

Reed, "Apparatus and Method of Energy Efficient Illumination Using Received Signals ," U.S. Appl. No. 13/085,301, filed Apr. 12, 2011, 99 pages.

Reed, "Electronic Control to Regulate Power for Solid-State Lighting and Methods Thereof," U.S. Appl. No. 61/115,438, filed Nov. 17, 2008, 51 pages.

Reed, "Electrostatic Discharge Protection for Luminaire," U.S. Appl. No. 13/212,074, filed Aug. 17, 2011, 30 pages.

Reed, "Apparatus and Method of Energy Efficient Illumination," U.S. Appl. No. 61/333,983, filed May 12, 2010, 57 pages.

Reed, "Apparatus and Method of Energy Efficient Illumination," U.S. Appl. No. 61/346,263, filed May 19, 2010, 67 pages.

Reed, "Electronic Control to Regulate Power for Solid-State Lighting and Methods Thereof," U.S. Appl. No. 61/154,619, filed Feb. 23, 2009, 62 pages.

Written Opinion, mailed Dec. 13, 2010 for PCT/US2010/035649, 4 pages.

Written Opinion, mailed Dec. 15, 2010 for PCT/US2010/035658, 3 pages.

Written Opinion, mailed Dec. 28, 2010 for PCT/US2010/035651, 3 pages.

Written Opinion, mailed Jul. 9, 2009 for PCT/US2009/043171, 8 pages.

Written Opinion, mailed Jun. 21, 2010 for PCT/US2009/064625, 5 pages.

Written Opinion, mailed Oct. 8, 2012 for PCT/US2012/033059, 3 pages.

* cited by examiner

RESONANT NETWORK FOR REDUCTION OF FLICKER PERCEPTION IN SOLID STATE LIGHTING SYSTEMS

CROSS REFERENCE TO RELATED APPLICATION

This application claims benefit under 35 U.S.C. 119(e) of U.S. Provisional Patent Application Ser. No. 61/527,029, filed Aug. 24, 2011, which is incorporated herein by reference in its entirety.

BACKGROUND

1. Technical Field

This disclosure is generally related to reduction of flicker perception in solid state lighting systems.

2. Description of the Related Art

Solid state lighting has many advantages over traditional lighting, such as incandescent and fluorescent bulbs. Solid state lighting devices exhibit lower energy consumption, longer lifetime, and improved robustness over traditional lighting. However, the existing approaches to electrically drive solid state lighting are known to generate undesirable side effects.

In particular, existing approaches may generate electromagnetic interference (EMI) and switching noise. Existing approaches generally employ a configuration of a switch-mode power supply to convert alternating current (AC) power to direct current (DC) power to operate the solid state light sources. Switch-mode power supplies excite a transformer by rapidly operating a switch, such as a metal-oxide semiconductor field effect transistor (MOSFET). The excitation of the transformer generates EMI that may interfere with signals intended for consumer electronics, such as cell phones, televisions, and radios. Additionally or alternatively, the rapid operation of the switch generates switching noise that may couple back to the main power line. Thus, using a switch-mode power supply to drive solid state lighting may generate the undesirable side effects of EMI and switching noise.

As an alternative to employing a switch-mode power supply, a solid state light source may be connected to directly to an alternating current (AC) line voltage or to a rectified AC line voltage. However, such operation of a solid state light source may result in visually, physiologically, and/or cognitively perceptible flicker. Flicker is a lighting performance factor similar to color rendering, color temperature, and glare and may affect user satisfaction and technology adoption. Lighting industry standards groups are still developing a unified definition of flicker, so a unified industrial standard definition does not currently exist. However, flicker may be defined as a periodic change in the instantaneous light output of a light source. More particularly, flicker may be defined as a periodic change in the instantaneous light output of a light source that may be visually, physiologically, and/or cognitively perceived. Because the brightness of the output of a solid state light source is a function current, the drive current may be used to characterize some aspects of flicker. For example, frequency of the flicker may be defined by the occurrences of cycles of the periodic change in light output or drive current per unit time, e.g., seconds. Accordingly, solid state light sources may have a flicker frequency that matches the frequency of an AC line current (e.g., mains or grid) or that matches the frequency of a rectified AC line current.

The intensity or amount of the flicker may be defined by or represented as a percent flicker or as a flicker index. The percent flicker is 100 multiplied by the maximum light output (A) in a period minus the minimum light output (B) in a period divided by the sum of the maximum and minimum, i.e., $100*(A-B)/(A+B)$. The flicker index depends upon an area under a graphical curve of a period of light output that is above an average light output (area 1) and the area under the curve that is below the average light output (area 2). The flicker index is defined by dividing area 1 by the sum of area 1 and area 2, i.e., area 1/(area 1+area 2).

Some government agencies have restricted the use of solid state lighting based on the frequency of flicker and not necessarily on the intensity of the flicker. In particular, the government agencies restrict the use of solid state lighting that exhibits flicker frequencies occurring at 120 hertz or slower. Light flicker at low frequencies (e.g., less than 120 hertz) has been attributed to inducing seizures, causing migraine headaches, dizziness, nausea, impaired visual performance, and general malaise. Thus, light flicker occurring at less than about 120 hertz may be visually, physiologically, and/or cognitively perceived through physical health side effects. Until recently, it was believed that light flicker at frequencies up to about 160 hertz was also unhealthy.

Perceptible flicker may become a problem for the LED industry because flicker may contribute to a negative perception of solid state lighting technology as a whole. If most LEDs exhibit flicker, the public may decide that all LEDs flicker. Such may discourage the adoption of LED lighting and/or may spur regulatory restrictions on the use of solid state lighting. Thus, EMI, switching noise, and visual, physiological, and/or cognitive side effects may also hinder the growth of solid state lighting, especially solid state lighting that is excited directly by AC power sources.

BRIEF SUMMARY

Herein disclosed is a solid state lighting system that employs a light source ballast having passive signal conditioning circuitry to increase the frequency of solid state lighting flicker, making it less physiologically and visually perceivable to a human. The passive signal conditioning circuitry may also reduce EMI and switching noise emissions, as compared to active solid state lighting ballasts.

A flicker control circuit for use with solid state lighting may be summarized as including a passive alternating current, or rectified alternating current, conditioner circuit that converts an alternating current input signal having a first frequency to an output signal having a second frequency that is greater than the first frequency of the alternating current, or rectified alternating current, input signal; and a passive resonating circuit coupled to the passive alternating current, or rectified alternating current, conditioner, to multiply the second frequency of the output signal to a multiplied frequency that is sufficiently high that a flicker from a plurality of solid state light sources powered by the output signal is undetectable by an unaided human eye.

The passive resonating circuit may include a number of passive electrical elements operable to increase the frequency of the first output signal. The number of passive electrical elements may be operable to multiply the second frequency of the output signal by four to six times greater than the first frequency of the alternating current input signal. The number of passive electrical elements may include at least one inductor and at least one capacitor. The at least one inductor and the at least one capacitor may be coupled together electrically in series and one of the at least one inductor and the at least one capacitor may be connected to a first node between the passive alternating current conditioner circuit and the passive resonating circuit. The at least one inductor may be connected to the first node and the at least one capacitor may be connected to a voltage reference. The at least one inductor may have an inductance of approximately 88 millihenries and the at least one capacitor may have a capacitance of approximately 20 microfarads. The at least one inductor may include a first inductor and a second inductor and the at least one capacitor may include a first capacitor and a second capacitor, the first inductor being coupled between the first capacitor and a first node that is between the passive alternating current conditioner circuit and the passive resonating circuit, the first capacitor being coupled between the first inductor and a second node, the second inductor being coupled between the first node and the second node, the second capacitor being coupled to the second inductor and the first capacitor at the second node. The second capacitor may be coupled between the second node and a voltage reference. The second frequency of the output signal may be at least six times greater than the first frequency of the alternating current input signal. The first inductor may have an inductance that is approximately the same value as an inductance of the second inductor. A current supplied to the plurality of solid state light sources from the first node may be positive while the alternating current input signal may be received by the flicker control circuit. The first capacitor may have a capacitance of approximately 20 microfarads. The second capacitor may have a capacitance that is greater than 8 times the capacitance of the first capacitor. The circuit may further include a first diode electrically coupled in series to a second diode, the first diode and the second diode being coupled between a first node and a second node, wherein the at least one capacitor includes a first capacitor and a second capacitor, the first capacitor being coupled between the first node and the second node, and the at least one inductor being coupled between the first node and the second node. A cathode terminal of the first diode may be connected to the first node, an anode terminal of the first diode may be connected to an anode terminal of the second diode and a cathode terminal of the second diode may be connected to the second node, wherein the second capacitor may be coupled between the second node and a voltage reference. The circuit may further include the plurality of solid state light sources may be at least partially electrically coupled in series to one another and may be configured to receive the output signal from the passive alternating current conditioning circuit.

A flicker control circuit for an alternating current lighting system employing solid state light sources may be summarized as including a diode rectifier circuit operable to receive an alternating current signal and provide a rectified current signal to a first node to provide power to a plurality of solid state light sources; and a passive signal conditioning resonant circuit electrically coupled to the first node and operable to increase a frequency of the rectified current signal at the first node to control a detectible flicker from the plurality of solid state light sources while providing a power factor in excess of 0.8.

The passive signal conditioning resonant circuit may be operable to at least double the frequency of the rectified current signal at the first node. The plurality of solid state light sources may be electrically coupled in series to each other and at least one of the plurality of solid state light sources may be coupled to the first node. The plurality of solid state light sources may be light emitting diodes. The passive signal conditioning resonant circuit may consist of a number of passive electrical components comprising at least one inductor and at least one capacitor configured to resonate at a desired frequency to increase the frequency of the rectified current signal. The desired frequency may be 120 hertz. The desired frequency may be 100 hertz. The at least one inductor may be coupled in electrical series with the at least one capacitor and the at least one inductor and the at least one capacitor may be coupled between the first node and a voltage reference. The at least one inductor may include a first inductor and a second inductor and the at least one capacitor may include a first capacitor and a second capacitor, the first inductor being coupled between the first node and the first capacitor, the first capacitor being coupled between the first inductor and a second node, the second inductor being coupled between the first node and the second node, the second capacitor being coupled between the second node and a ground reference. The first capacitor may have a capacitance that is less than ⅛ of a capacitance of the second capacitor. The passive conditioning resonant circuit may further include a first diode connected in electrical series to a second diode, the at least one capacitor including a first capacitor and a second capacitor, the first and second diodes being connected electrically in parallel to the first capacitor and to the at least one inductor between a first node and a second node. The second capacitor may be coupled between the second node and a ground reference and the first and second diodes may be zener diodes.

A method of operating a string of a plurality of solid state light sources without an active switch may be summarized as including receiving an alternating current signal at an input terminal; rectifying the alternating current signal with a rectifier bridge and providing a rectified current signal to a first node, the rectified current signal having a frequency that is approximately double a frequency of the alternating current signal; increasing the frequency of the rectified current signal with a resonant network including passive electrical elements to reduce the detectability of amplitude variations in the rectified current signal by an unaided human eye as emitted by the plurality of solid state light sources; and providing the rectified current signal to the string of the plurality of solid state light sources to forward bias the plurality of solid state light sources.

Receiving the alternating current signal may include receiving the alternating current signal at a frequency of 120 hertz. Receiving may include receiving the alternating current signal at a frequency of 100 hertz. Increasing the frequency of the rectified current signal may include increasing the frequency to 200-260 hertz. Increasing the frequency of the rectified current signal may include increasing the frequency to 320-380 hertz.

The structures and methods taught herein may be advantageously employed in a variety of solid state lighting systems and structures. For example, the structures and/or methods taught herein may be advantageously employed as the input to the structures taught in the U.S. patent application Publication No. 2010-0123403.

BRIEF DESCRIPTION OF THE SEVERAL
VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with lighting systems, for example power converters, thermal management structures and subsystems, and/or solid state lights have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and the appended claims, references are made to a "node" or "nodes." It is understood that a node may be a pad, a pin, a junction, a connector, a wire, or any other point recognizable by one of ordinary skill in the art as being suitable for making an electrical connection within an integrated circuit, on a circuit board, in a chassis, or the like.

The headings and Abstract of the Disclosure provided herein are for convenience only and do not interpret the scope or meaning of the embodiments.

Figure 1:
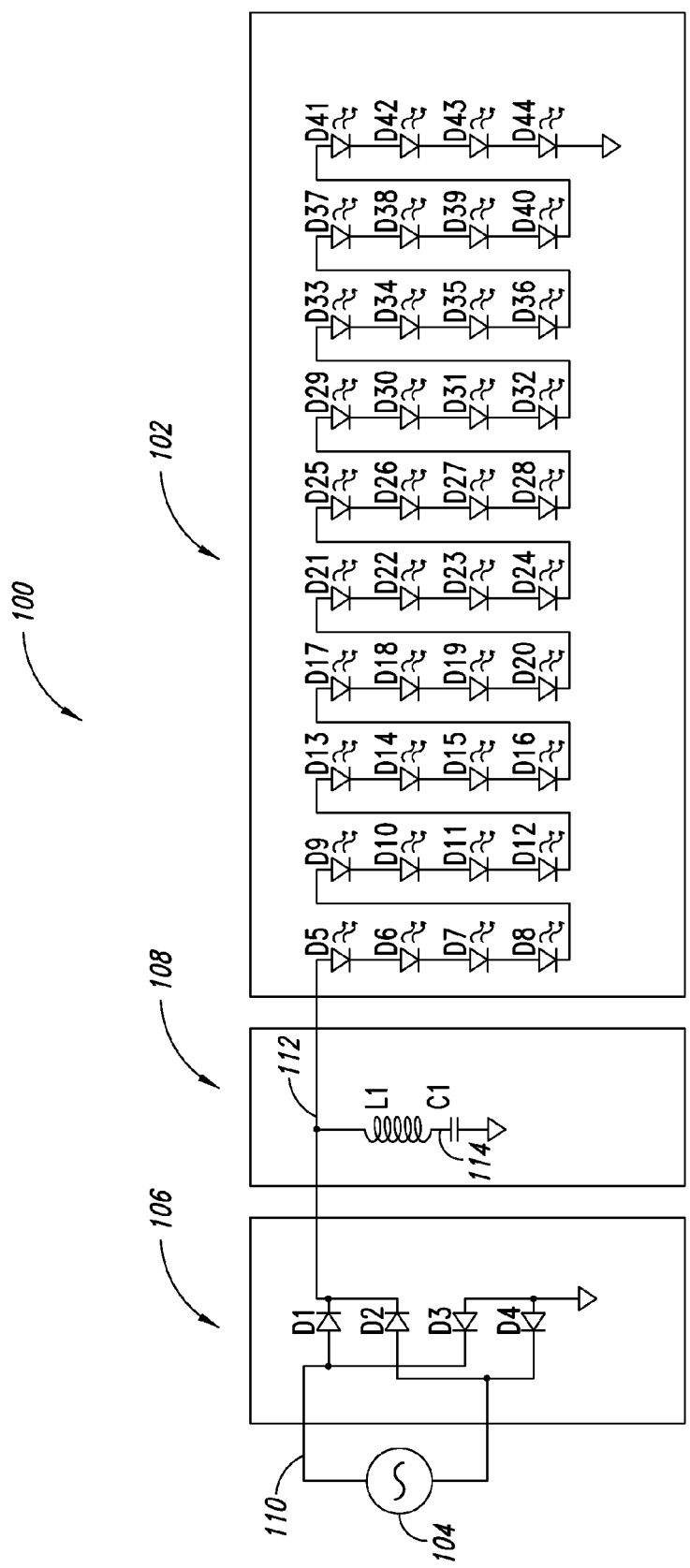
FIG. 1 is a schematic diagram of a lighting system, according to one illustrated embodiment.

FIG. 1 shows a lighting or illumination system 100, according to one embodiment. The lighting system 100 includes a solid state light source 102, an alternating current (AC) power supply 104, an AC signal conditioner 106, and a passive resonating circuit 108.

The solid state light source 102 may include a string of light emitting diodes (LEDs) D5-D44. Each of the LEDs D5-D44 may have a forward voltage drop in the range of 2.5-4.5 volts. A voltage applied to an LED that is below this range may be insufficient to cause the LED to emit light, and a voltage applied to an LED that is above this range may render the LED inoperable or may significantly reduce the lifespan of the LED. Thus, a continuous string of 40 LEDs, e.g., LEDs D5-D44, that are connected electrically in series may operate by receiving a voltage in the range of 100-180 volts (i.e., 2.5 volts×40 to 4.5 volts×40). According to another embodiment, the solid state light source 102 may include multiple strings of LEDs with each of the strings of LEDs electrically coupled in parallel to each of the other strings of LEDs.

As with many types of diodes, LEDs conduct current while forward-biased and leak minor amounts of current while reverse biased. As compared to monitoring current flow through an LED, it is more difficult to determine whether an LED is emitting light based solely on the voltage applied across the LED. Thus, current flow through the solid state light source 102, rather than the voltage applied across the light source 102, will be referenced during the discussion of the graphs of FIGS. 2, 4, and 6.

The power supply 104 supplies an AC power signal consisting of a voltage and a current to a node 110. The frequency and amplitude of the AC power signal supplied by the power supply 104 may span a range of values. The frequency of the AC power signal may be any frequency greater than 30 hertz. The lower limit of this frequency will be discussed in more detail below. The power supply 104 may be a light receptacle which supplies AC voltage and current at, for example, 50 hertz in some parts of the world or 60 hertz in North America. Alternatively, the power supply 104 may supply the AC power signal as a rectified alternating current.

The amplitude of the AC voltage supplied by the power supply 104 may span a wide range of values. The amplitude of the AC voltage may range from 3 volts to several-hundred volts, depending upon the characteristics of the light source 102. For example, an AC voltage having an amplitude of 3 volts may be desirable when the light source 102 is a single LED or includes multiple LEDs coupled electrically in parallel. In North America, the amplitude of the AC voltage supplied to light fixtures and receptacles is approximately 170 volts zero-to-peak, or approximately 110-120 volts root-mean-squared (rms) zero-to-peak. Accordingly, the voltage supplied to a typical North American light receptacle (~120 Vrms) is suitable to meet the operational range (141-187 volts zero to peak) of the string of 50 LEDs D5-D44 as determined by a forward-voltage range of 2.5-4.5 volts per each LED, typically 3.25V at rated LED current.

The AC conditioning circuit 106 may be coupled to the AC power supply 104 at the node 110 to receive the AC power signal. From the AC power signal, the AC conditioning circuit 106 may generate a rectified output signal having a frequency that is twice the frequency of the received AC power signal. Alternatively, the AC conditioning circuit 106 may be configured to generate a rectified output signal having a frequency that is greater than the frequency of the received AC power signal that is already a rectified alternating current signal. The frequency is determined by inverting a period of the rectified output signal. A period of the rectified output signal is the time elapsed between one amplitude maximum (voltage or current) to a next amplitude maximum.

The AC conditioning circuit 106 may be a passive circuit, such as a full-wave diode rectifier bridge, as illustrated. Diodes D1-D4 may be configured, as known in the art, to receive the AC power signal and generate the rectified output signal. Although rectified power signals are commonly considered to be direct current (DC) signals, the rectified output signal will be referred to as having a frequency that is the reciprocal of the period, discussed above.

The AC conditioning circuit 106 may generate the rectified output signal at a first frequency at a node 112.

The passive resonating circuit 108 may be electrically coupled to the AC conditioning circuit 106 to receive the rectified output signal at the node 112. The passive resonating circuit 108 may include an inductor L1 electrically coupled or directly connected to the node 112. The passive resonating circuit 108 may also include a capacitor C1 electrically coupled or directly connected between a voltage reference or potential and the inductor L1 at a node 114. The voltage reference or potential may be ground or may be a voltage bias or potential held at a particular value to improve the operational characteristics of the passive resonating circuit 108.

The values of the passive components of the passive resonating circuit 108 may be selected or set to cause the passive resonating circuit 108 to resonate at the first frequency of the rectified output signal. In other words, the values of the inductor L1 and the capacitor C1 may be selected or set to have a resonant frequency that is approximately twice the frequency of the AC power signal from the AC power source 104. Typically, an LC circuit resonates at a frequency in which the impedance of the inductor ($Z_L=j\omega L$) summed with the impedance of the capacitor ($Z_C=1/(j\omega C)$) is equal to zero.

The resonant frequency f of an LC circuit may be determined mathematically as follows:

$$f = \frac{1}{(2\pi\sqrt{L1*C1})}.$$

According to one embodiment, the inductor L1 has an inductance of 88 millihenries and the capacitor C1 has an inductance of 20 microfarads, so that the resonant frequency f is 120 hertz. The inductor L1 may be a ferrite core or laminated iron core inductor with a single winding. The inductor L1 may also be constructed with two windings on a single shared core. The capacitor C1 may be an electrolytic, ceramic, tantalum, polypropylene film, or polyester metal film capacitor. Other values may be chosen for the inductor L1 and the capacitor C1 to achieve the desired frequency. Furthermore, the values of inductor L1 and capacitor C1 may be selected or set to produce resonant frequencies that are higher than, or lower than, twice the frequency of the AC power signal from the AC power source 104. For example, in Europe where the AC power source 104 generates the AC power signal at 50 hertz, and the AC conditioning signal generates a rectified output signal at 100 hertz, a capacitor C1 with a 27 microfarad capacitance may be used to cause the passive resonating circuit 108 to have a resonating frequency f of approximately 103 hertz.

The passive resonating circuit 108 may multiply the frequency of the rectified output signal at the node 112 from the first frequency to a second frequency. In the absence of the passive resonating circuit 108, the rectified output signal may have a first frequency of 120 hertz at the node 112. The addition of the passive resonating circuit 108 that is excited by the 120 hertz rectified output signal may multiply the frequency of the rectified output signal at the node 112 from a first frequency of 120 hertz to a second frequency of 240 hertz. In countries supplying a 50 hertz AC power signal, the passive resonating circuit 108 may multiply the frequency of the rectified output signal at the node 112 from a first frequency of 100 hertz to, for example, a second frequency of 200 hertz. Thus, the passive resonating circuit 108 multiplies the frequency of the rectified output signal from a first frequency that is, for example, twice as high as the frequency of the AC power signal to a second frequency that is, for example, at least four-times as high as the frequency of the AC power signal. Accordingly, the lighting system 100 may receive an AC power signal having a frequency that is greater than 30 hertz and may multiply the frequency of that signal to exceed the 120 hertz threshold at which flicker has been determined to no longer be physiologically or visually perceived by humans.

Figure 2:
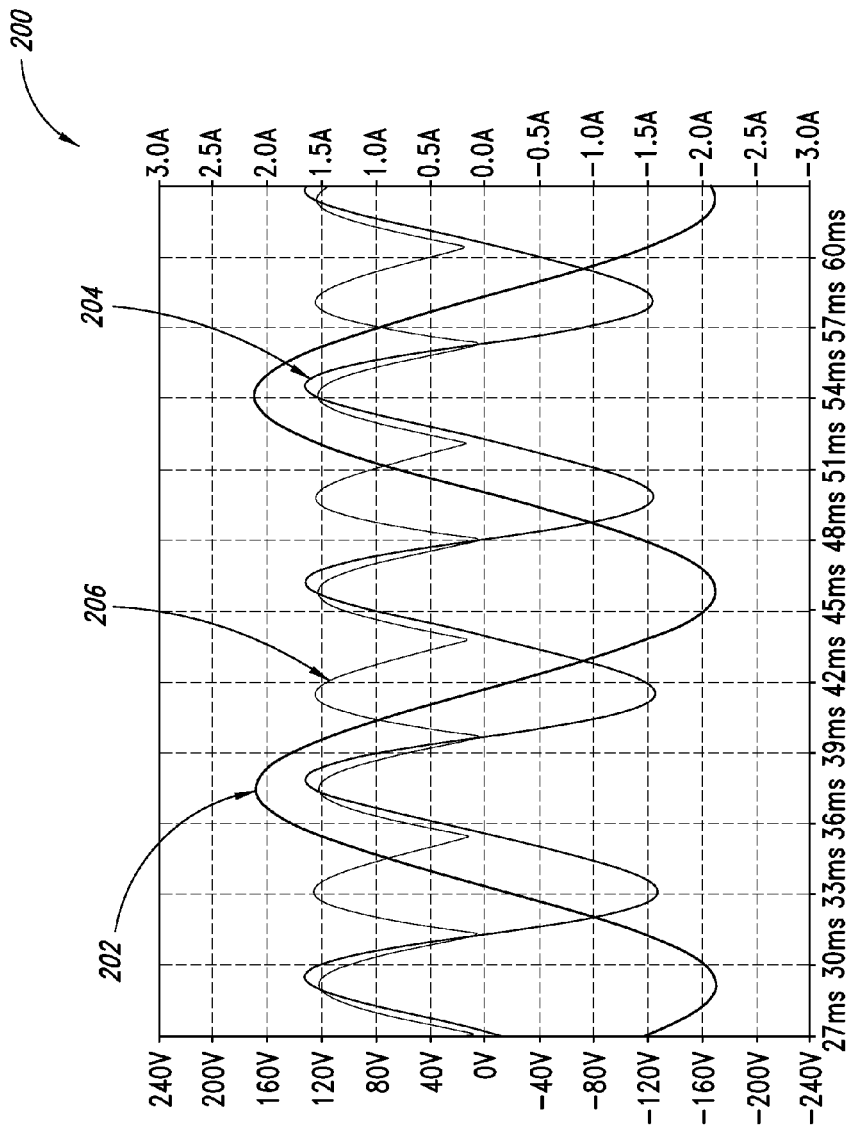
FIG. 2 is a graph of voltage and current signals in the lighting system of FIG. 1, according to one illustrated embodiment.

FIG. 2 shows a graph 200 which includes plots of signals measured at various nodes in the lighting system 100. The graph 200 includes a plot of the voltage 202 of the AC power signal as measured at the node 110, a plot of a current 204 measured through the inductor L1, and a plot of a current 206 flowing from the node 112 and through the solid state light source 102.

The AC power supply 104 generates the voltage 202 of the AC power signal at the node 110. The voltage 202 has a zero-to-peak amplitude of approximately 180 volts (~120 Vrms). The voltage 202 has a frequency of 60 hertz.

The current 204 flows through the inductor L1 oscillates at approximately the same frequency (e.g., 120 hertz) as the first frequency of the rectified output signal from the AC conditioning circuit 106. The rectified output signal excites the passive resonating circuit 108 at the first frequency. The passive resonating circuit 108 doubles the frequency of the current of the rectified output signal. The passive resonating circuit 108 may double or multiply the frequency of the current at the node 112 by rectifying the current 204 that flows through the inductor L1.

The current 206 flows from the node 112 through the solid state light source 102. The current 206 has a frequency that is, for example, two-times greater than the current 204 through the inductor L1. According to the embodiment illustrated in graph 200, the current 206 has a frequency of 240 hertz and is non-zero. According to another embodiment, the current 206 has a frequency of 360 hertz, which is six times greater than the frequency of the voltage 202 of the AC power signal.

The passive resonating circuit 108 has several advantages over conventional techniques practiced, such as simply connecting a capacitor across the solid state light source 102. Connecting a large capacitor to the output of a diode rectifier bridge is a common technique used to decrease the ripple from the diode rectifier bridge in order to provide a smoothed DC signal to LEDs. However, simply connecting a capacitor across the solid state light source 102 is not useful in practice because it creates unacceptable phase shifts relative to the AC power signal and results in a low power factor. By contrast, the embodiment of FIG. 1 may have a power factor greater than 0.85.

Another disadvantage of using a capacitor connected across the solid state light source 102 is that a large capacitor is needed to perform smoothing. A large capacitor, such as one having a capacitance of several hundred microfarads or more, causes high currents to flow relative to the peak of the AC power signal, resulting in high crest factors and high total harmonic distortion. By contrast, the embodiment of FIG. 1 may use a smaller and therefore less costly capacitor, such as a 20 microfarad electrolytic capacitor, than used for DC smoothing.

The embodiment of FIG. 1 has advantages over LED drivers employing switch mode power supplies. As discussed previously, switch mode power supplies use active switches, such as MOSFETs, to regulate power supplied to LED load. Switch mode power supplies generate electromagnetic interference (EMI) by rapidly inducing magnetic fields in an inductor or transformer. The generated EMI can affect cell phone communication quality as well as television and radio reception. The rapid switching action of a switch mode power supply also generates switching noise which may couple to the main power line or AC power source 104. The lighting system 100 advantageously employs passive components, such as the AC conditioning circuit 106 and the passive resonating circuit 108, to ballast or drive the LEDs D5-D44 while generating much less EMI with simpler, i.e., less costly, electrical components than a switch mode power supply. Notably, fewer and less costly components results in lower manufacturing costs.

The lighting system 100 is advantageously robust to passive component tolerances. For example, the passive resonating circuit 108 may employ passive components having tolerances up to 20% and still operate desirably. Because passive components having tolerances up to 20% are less-costly to manufacture and purchase, the lighting system 100 may be manufactured more cost-effectively than lighting systems requiring components of more exacting tolerances.

Figure 3:
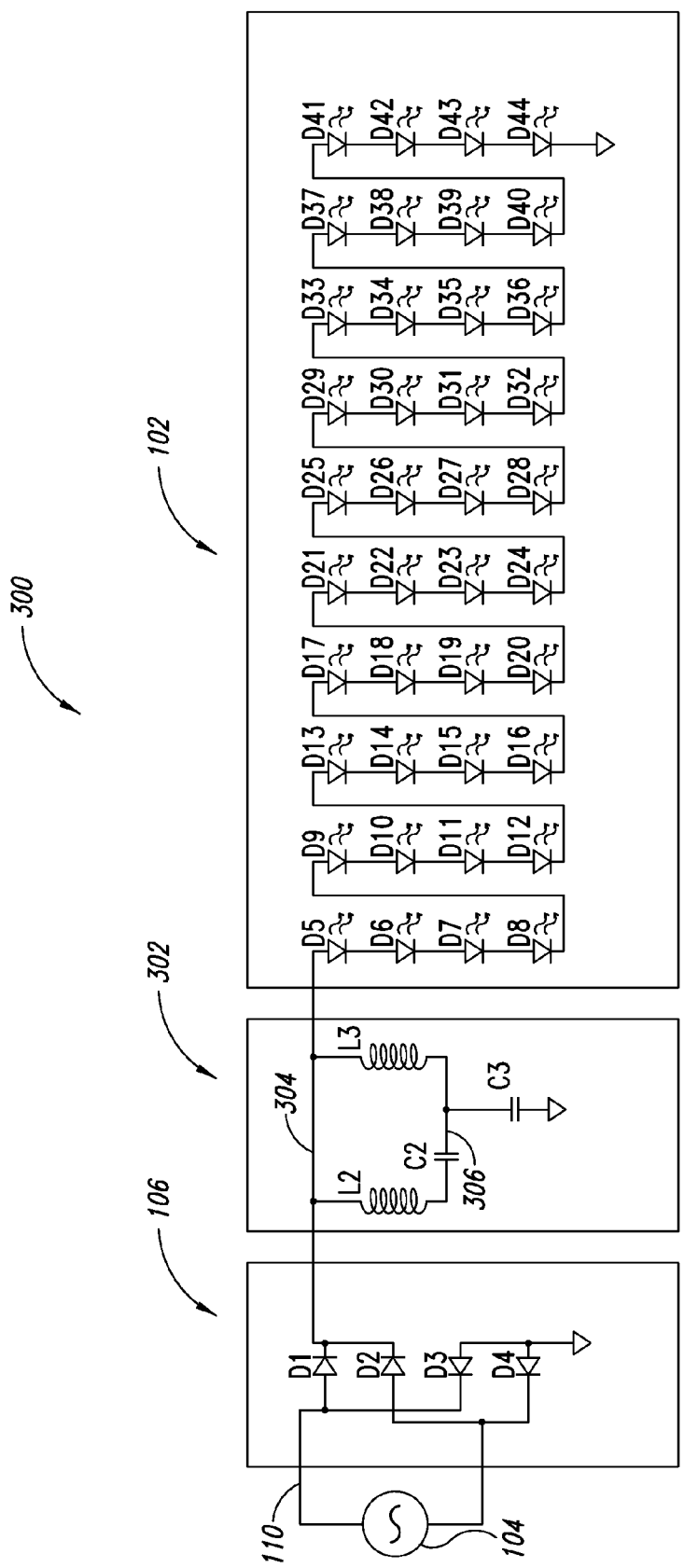
FIG. 3 is a schematic diagram of a lighting system, according to one illustrated embodiment.

FIG. 3 illustrates a lighting system 300. The lighting system 300 includes the solid state light source 102, the (AC) power supply 104, the AC signal conditioner 106, and a passive resonating circuit 302. For the sake of brevity, a description will not repeated for features having the same reference numbers as features illustrated in previous Figures.

The passive resonating circuit 302 may be electrically coupled to the AC conditioning circuit 104 to receive the rectified output signal at a node 304. The passive resonating circuit 302 may include an inductor L2 electrically coupled or directly connected to the node 304 and a capacitor C2 electrically coupled or directly connected between a node 306 and the inductor L2. An inductor L3 may also be electrically coupled or directly connected between the node 304 and the node 306. A capacitor C3 may be electrically coupled or connected to the capacitor C2 and the inductor L3 at the node 306. The capacitor C3 may also be connected to a voltage reference or potential, such as ground or a voltage bias.

The passive resonating circuit 302 may be configured to resonate at the first frequency of the rectified output signal. In other words, the values of the inductors L2 and L3 and the capacitors C2 and C3 may be selected or set so as to produce a resonant frequency that is, for example, approximately twice the frequency of the AC power signal from the AC power source 104.

According to one embodiment, the inductance of the inductor L2 is 10 millihenries, the inductance of the inductor L3 is 10 millihenries, the capacitance of the capacitor C2 is 20 microfarads, and the capacitance of the capacitor C3 is 100 microfarads, so that the passive resonating circuit 302 at least partially resonates at a frequency of approximately 120 hertz. Each inductor L2, L3 may be implemented with a single-winding inductor or with a multiple-winding inductor. The capacitor C2 may be a polyester film capacitor. The capacitor C3 may be an electrolytic capacitor. Inductors L2, L3 and/or capacitors C2, C3 with other values may be selected or chosen to excite the passive resonating circuit 302 at a desired frequency. Furthermore, the values of the inductors L2, L3 and the capacitors C2, C3 may be selected or set to cause the passive resonating circuit 302 to resonate at frequencies that are higher, or lower, than the first frequency of the signal output, so as to decrease the magnitude of the response of the passive resonating circuit 302 to the first frequency of the rectified output signal.

The passive resonating circuit 302 may multiply the frequency of the rectified output signal at the node 304 from the first frequency to the second frequency. Exciting the passive resonating circuit 302 with a 100-120 hertz rectified output signal may result in multiplication of the frequency of the rectified output signal at the node 304 from a first frequency of 100-120 hertz to a second frequency of 200-240 hertz. Accordingly, the passive resonating circuit 302 multiplies the frequency of the rectified output signal from a first frequency that is, for example, twice as high as the frequency of the AC power signal (50-60 hertz) to a second frequency that is, for example, at least four-times as high as the frequency of the AC power signal.

Figure 4:
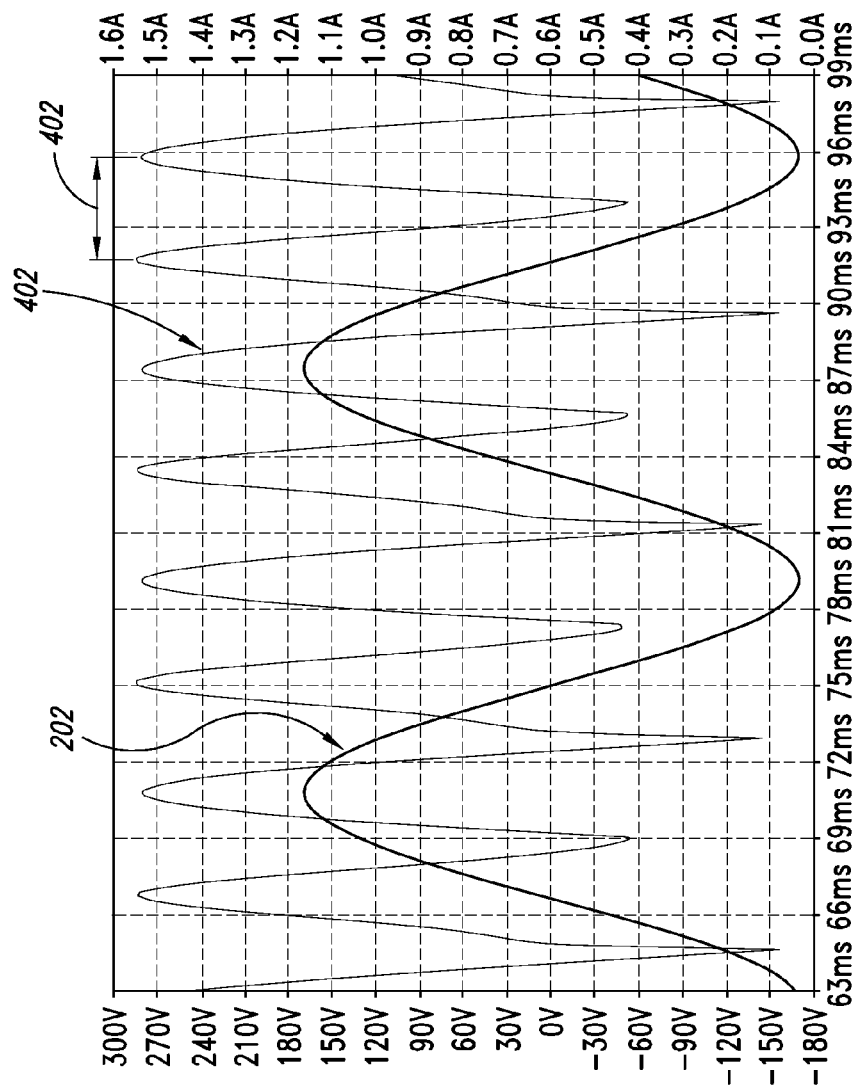
FIG. 4 is a graph of voltage and current signals in the lighting system of FIG. 3, according to one illustrated embodiment.

FIG. 4 shows a graph 400 which includes plots of signals measured at various nodes in the lighting system 300. The graph 400 includes a plot of the voltage 202 of the AC power signal as measured at the node 110 and a plot of the current 402 flowing from the node 304 through the solid state light source 102.

The current signal 402 flows from the node 304 through the solid state light source 102. The current signal 402 has a frequency that is two-times greater than the frequency of the rectified output signal generated by the AC conditioning circuit 106. According to an embodiment illustrated in graph 400, the period 404 of the current signal 402 is approximately 4 milliseconds, the frequency of the current signal 402 is approximately 244 hertz, and the current signal 402 is non-zero. The frequency of the current signal 402 may be, for example, as low as 200 hertz or as high as 260 hertz. According to another embodiment, the current signal 402 has a frequency of approximately 360 hertz which is six times greater than the frequency of the voltage signal 202 of the AC power signal. The frequency of the current signal 402 may also be, for example, as low as 300 hertz or as high as 380 hertz.

The passive resonating circuit 302 may be implemented with smaller and less-expensive components than the passive resonating circuit 108. The passive resonating circuit 302 may use lower-inductance inductors L2, L3 in place of a single higher-inductance inductor L1 to multiply the frequency of the rectified output signal. The lower-inductance inductors L2, L3 may have a lower resistance than a single larger inductor, the employment thereof may therefore result in lower losses due to power dissipation in the passive resonating circuit 302. The inductors L2, L3 of the passive resonating circuit 302 may be both dimensionally smaller and lighter weight than the inductor L1 of the passive resonating circuit 108. Because the passive resonating circuit 108 or 302 is part of an LED ballast and may be fitted into a ballast housing, both weight and size of the components of the passive resonating circuit 108 or 302 influence the marketability of the lighting system 300. Additionally, two lower-inductance inductors L2, L3 may be less costly than that of a single higher-inductance inductor L1. The lighting system 300 may be implement with passive components having tolerances of up to 20% and still operate as desired.

Figure 5:
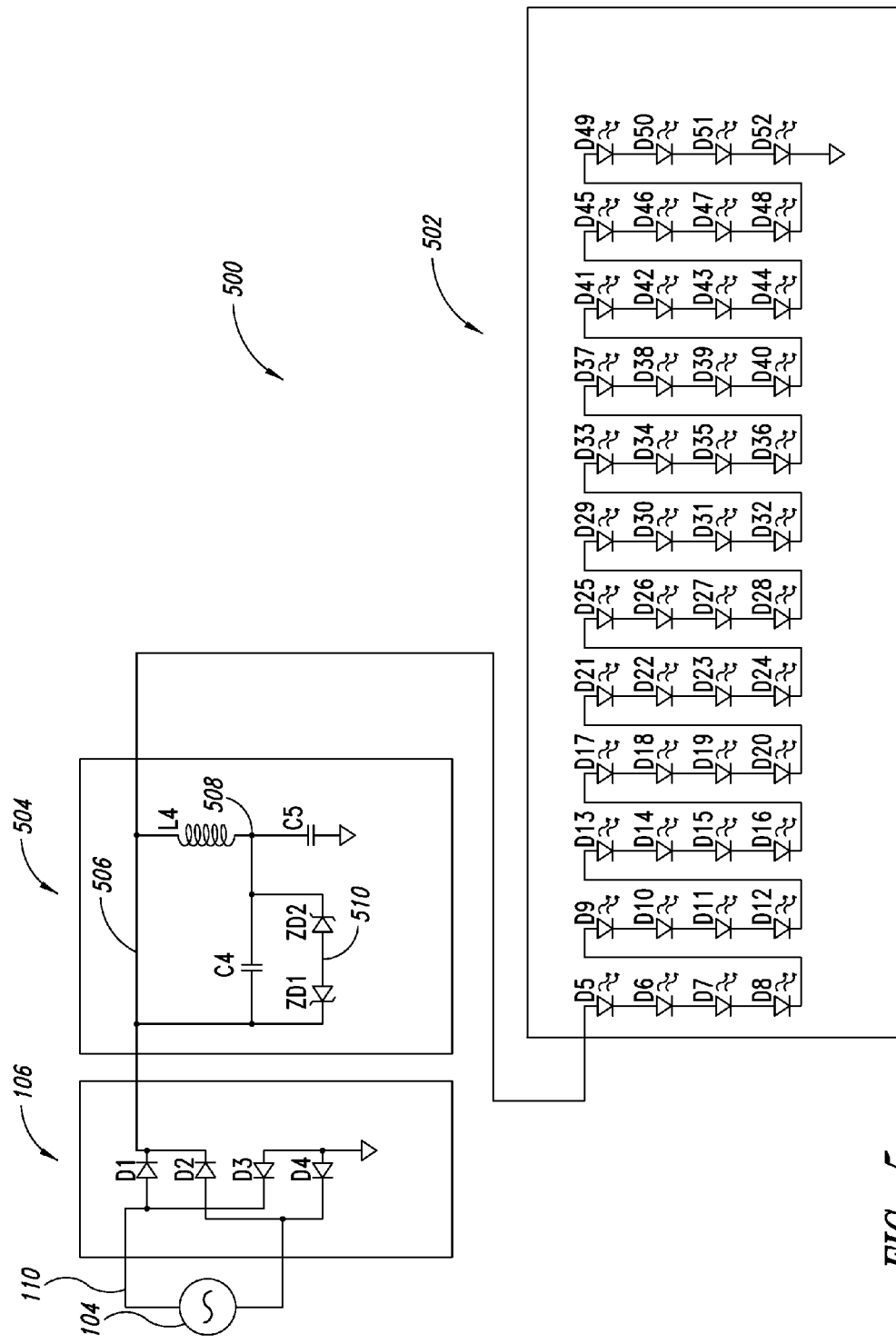
FIG. 5 is a schematic diagram of a lighting system, according to one illustrated embodiment.

FIG. 5 illustrates a lighting system 500. The lighting system 500 includes a solid state light source 502, the AC power supply 104, the AC signal conditioner 106, and a passive resonating circuit 504.

The solid state light source 502 may include more LEDs than the previously illustrated solid state light sources 102. For example, the solid state light source 502 may include 48 LEDs D5-D52. Using a string of 48 LEDs may advantageously cause the solid state light source 502 to consume less current by decreasing the voltage drop across each of the 48 LEDs D5-D52.

The passive resonating circuit 504 may be electrically coupled to the AC conditioning circuit 106 to receive the rectified output signal at a node 506. The passive resonating circuit 504 may include an inductor L4 electrically coupled or directly connected between the node 506 and a node 508. The passive resonating circuit 504 may also include a capacitor C4 electrically coupled or directly connected between the node 506 and the node 508. A pair of zener diodes ZD1, ZD2 may be electrically coupled in parallel to the capacitor C4, such that a cathode terminal of the first zener diode ZD1 is connected to the node 506, a cathode terminal of the second zener diode ZD2 is connected to the node 508, and anode terminals of the pair of zener diodes ZD1, ZD2 are connected together at a node 510. A capacitor C5 may also be electrically coupled or connected to the capacitor C4, the inductor L4, and the cathode terminal of the second zener diode ZD2 at the node 508. The capacitor C5 may also be connected to a voltage reference, such as ground or a voltage bias.

The passive resonating circuit 504 may be configured to resonate at the first frequency of the rectified output signal. In other words, the inductor L4 and the capacitors C4 and C5 may be selected with values that cause the passive resonating circuit 504 to have a resonant frequency that is, for example, approximately twice the frequency of the AC power signal (50-60 hertz) from the AC power source 104.

For instance, the inductance of the inductor L4 is 10 millihenries, the capacitance of the capacitor C4 is 40 microfarads, the capacitance of the capacitor C5 is 200 microfarads, and the breakdown or reverse voltage of the zener diodes ZD1, ZD2 is 33 volts so that the passive resonating circuit 504 resonates at a frequency of approximately 120 hertz. The inductor L4 may be toroidal and may have multiple windings. The capacitor C4 may be a polyester film capacitor. The capacitor C5 may be an electrolytic capacitor. The inductor L4 and the capacitors C4, C5 may be selected with other inductance and capacitance values to excite the passive resonating circuit 504 at other frequencies.

The passive resonating circuit 504 may multiply the frequency of the rectified output signal at the node 506 from the first frequency to the second frequency. The passive resonating circuit 504 that is excited by a 100-120 hertz rectified output signal may multiply the frequency of the rectified output signal at the node 506 from a first frequency of, for example, 100-120 hertz to a second frequency of, for example, 200-240 hertz, or higher. Accordingly, the passive resonating circuit 504 multiplies the frequency of the rectified output signal from a first frequency that is, for example, twice as high as the frequency of the AC power signal (50-60 hertz) to a second frequency that is, for example, at least four-times as high as the frequency of the AC power signal.

Figure 6:
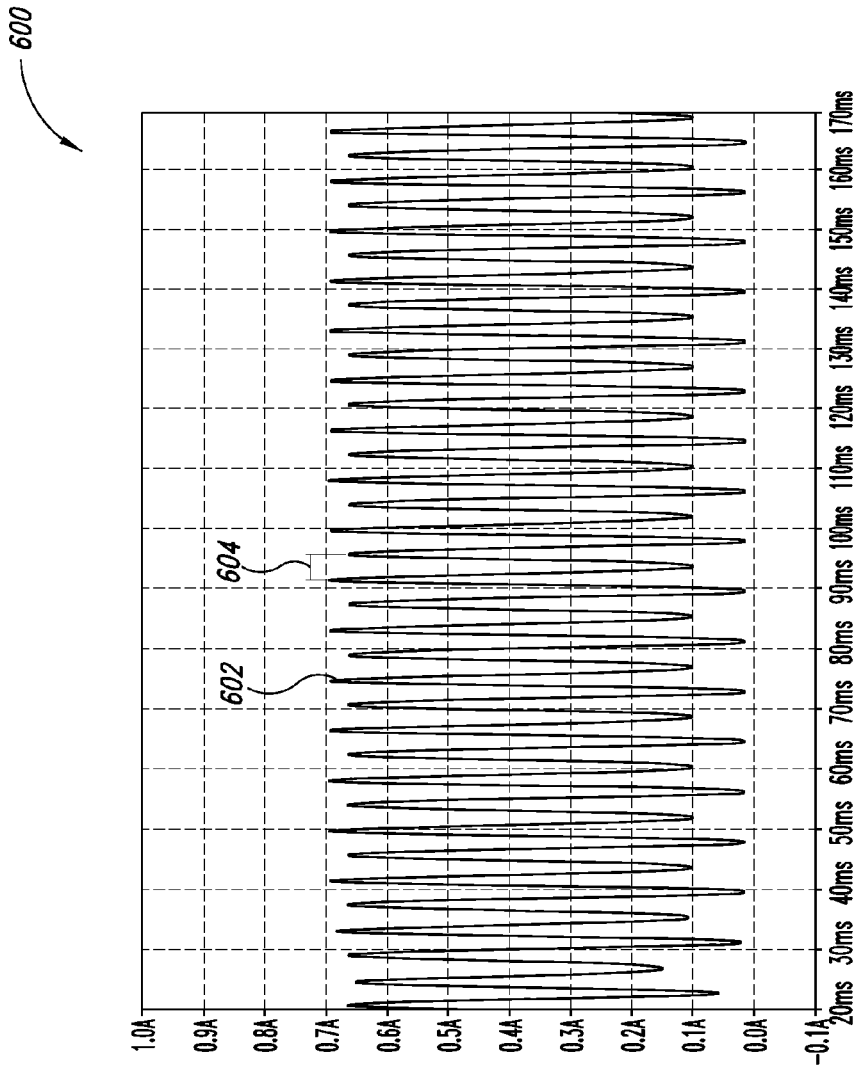
FIG. 6 is a graph of a current signal in the lighting system of FIG. 5, according to one illustrated embodiment.

FIG. 6 shows a graph 600 which includes a plot of a current signal 602 measured through the solid state lighting device 102.

The current signal 602 flows from the node 506 of the passive resonating circuit 504 through the solid state light source 502. The current signal 602 has a frequency that is more than two-times greater than the rectified output signal generated by the AC conditioning circuit 106. According to the illustrated graph 600, the period 604 of the current signal 602 is approximately 3.8 milliseconds, the frequency of the current signal 602 is approximately 257 hertz, and the current signal 602 is non-zero, so the solid state light source 502 remains turned ON during operation of the lighting system 500. Notably, the current signal 602 has an approximate average of 350 milliamperes, which is less than half of the average current of the previously disclosed embodiments. Thus, the quantity of power consumed by the lighting system 500 may be less than one-fourth the quantity of power consumed by the lighting system 100 or 300. Alternatively, the current signal 602 may have a frequency of approximately 360 hertz, which is six times greater than the frequency of the voltage signal 202 of the AC power signal.

Advantageously, the passive resonating circuit 504 may be implemented with smaller and less-expensive components than the previously illustrated passive resonating circuits 108 and 302. The passive resonating circuit 504 may use a single inductor L4 that is significantly smaller than the inductor L1 of the passive resonating circuit 108 and that is one less component than the two inductors L2, L3 of the passive resonating circuit 302. Thus, the use of the single inductor L1 results in a lower resistance and lower power dissipation in the passive resonator circuit 504 than may be exhibited by passive resonator circuits 108 and 302. Additionally, two zener diodes ZD1, ZD2 may be significantly lighter and less expensive than a single larger inductance (e.g., 10 millihenry) inductor, so the passive resonating circuit 504 may be lighter and less costly to manufacture than the passive resonating circuit 302.

Figure 7:
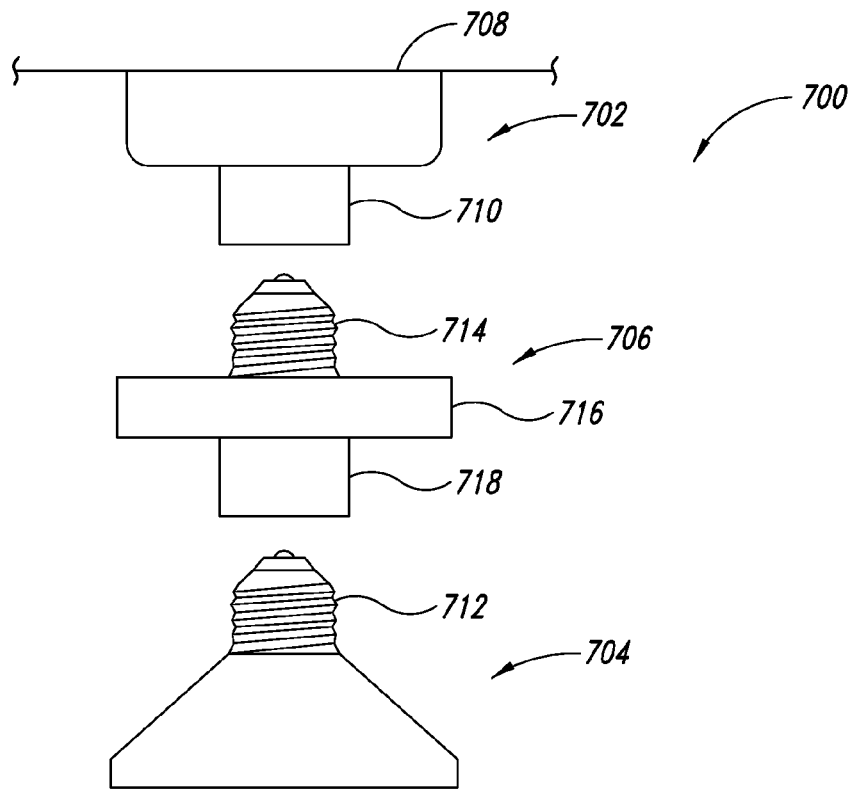
FIG. 7 is a diagram showing an implementation of the lighting system of FIG. 1, 3, or 5, according to one illustrated embodiment.

FIG. 7 illustrates a retrofit AC solid state lighting system 700. The system 700 may include a conventional light fixture 702, a solid state light source 704, and a solid state lighting ballast 706 configured to couple the solid state light source 704 to the light fixture 702.

The conventional light fixture 702 includes a receptacle 710, such as a threaded socket, and may be, for example, mounted to a ceiling 708. The light fixture 702 provides AC power to the receptacle 710.

The solid state light source 704 may include a string of LEDs such as those illustrated in FIG. 1 or FIG. 5. The string of LEDs may be electrically coupled to the base 712 of the light source 704 to receive power from the light fixture 702, through the solid state lighting ballast 706.

The solid state lighting ballast 706 may be used with a variety of light sources and may be used to retrofit solid state light sources 704 to conventional light fixtures 702. The solid state lighting ballast 706 may include a base 714, a ballast housing 716, and a receptacle 718. The base 714 is threaded to be adaptable with the receptacle 710 of the light fixture 702. The base 714 is electrically coupled to ballast circuitry (not shown) that is within the ballast housing 716. The ballast circuitry may include the AC conditioning circuit 106 and any one of the passive conditioning circuits 108, 302, and 504 to provide a power signal to the receptacle 718 that results in a solid state light source having a frequency of flicker that is faster than may be visually, physiologically, or cognitively perceived by an unaided human, e.g., greater than 120 hertz. The receptacle 718 may be a threaded socket that is adaptable to receive a base 712 of the solid state light source 704.

Figure 8:
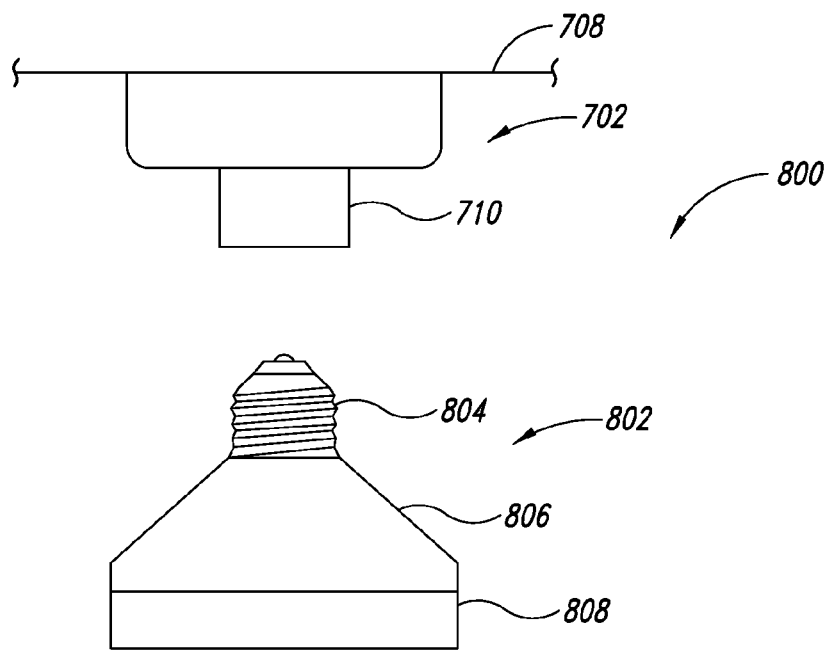
FIG. 8 is a diagram showing an implementation of a lighting system of FIG. 1, 3, or 5, according to one illustrated embodiment.

FIG. 8 illustrates a solid state lighting system 800. The lighting system 800 includes the light fixture 702 having the receptacle 710 and a lamp 802.

The lamp 802 includes a base 804, an integrated ballast housing 806, and a solid state light source 808 integrally coupled to the ballast housing 806. The base 804 is electrically and mechanically coupleable to the receptacle 710 to secure the lamp 802 to the light fixture 702 and to transfer power from the light fixture 702 to the lamp 802. The integrated ballast housing 806 encloses ballast circuitry (not shown) such as the type embodied in the AC conditioning circuit 106 and the passive conditioning circuits 108, 302, and 502. The ballast circuitry conditions the AC power delivered by the light fixture 702 so as to be suitable for use by the solid state light source 808. The solid state light source 808 may include a plurality of LEDs configured to receive power from the ballast circuitry and, in response to receiving power, transmit visible light from the lamp 802.

Figure 9:
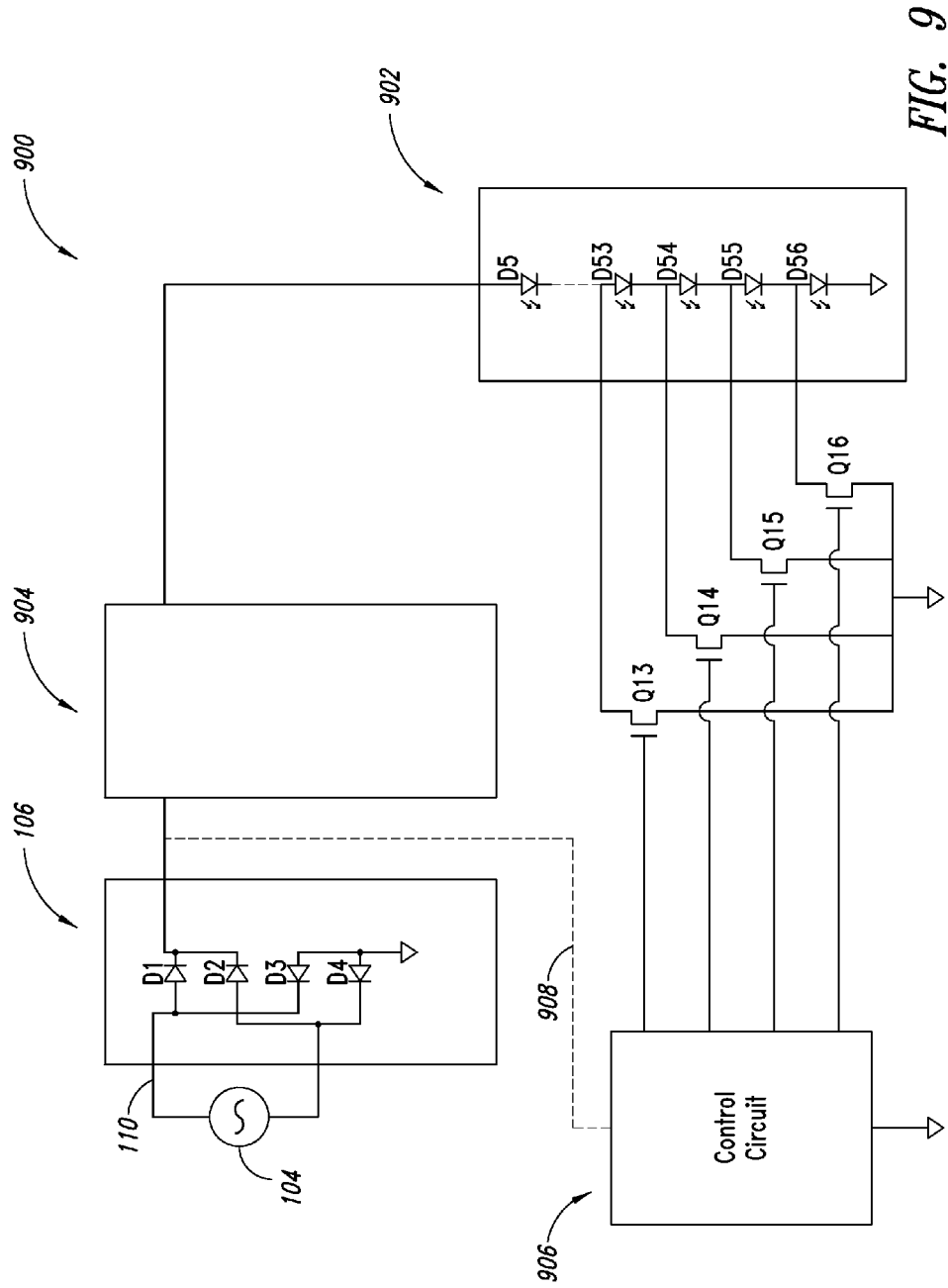
FIG. 9 is a schematic diagram of a lighting system, according to one illustrated embodiment.

FIG. 9 illustrates a lighting system 900, according to one illustrated embodiment. The lighting system 900 includes a light source 902, a passive resonating circuit 904 configured to supply power to the light source 902, and a control circuit 906 to regulate an input power applied to a finite number of light emitters D5-D56 within the light source 902.

The light source 902 may include a plurality of LEDs D5-D56. The LEDs D5-D56 may form a string of LEDs connected to each other in electrical series. Alternatively, one or more of the LEDs D5-D56 may be coupled in electrical parallel to one or more other LEDs D5-D56. The light source 902 may receive power from a passive resonating circuit 904.

The passive resonating circuit 904 may be any one of the passive resonating circuits 108, 302, and 504 discussed above. The passive resonating circuit 904 receives a rectified output signal from the passive signal conditioning circuit 106 and increases the frequency of the rectified output signal from a first frequency to a second frequency higher than the first frequency to supply power to the light source 902.

The control circuit 906 regulates how many of the LEDs D5-D56 receive power from the passive resonating circuit 904. The control circuit 906 may receive power from the AC conditioning circuit 106 through optional connection 908. The control circuit 906 may be coupled to, or electrically connected to, a plurality of switches Q13-Q16 to switchably bypass portions of the string of LEDs D5-D56. Each of the switches Q13-Q16 may be configured to switchably connect an anode terminal of one of the LEDs D5-D56 to ground. The control circuit 906 may control the switches Q13-Q16 to switchably bypass a portion of the string of LEDs D5-D56 in order to increase or decrease the current and voltage being applied to each of the LEDs D5-D56.

For example, one mode of operation of the light source 902 may include having the switch Q15 turned ON in the closed position so that current flows from LED D54 to ground. In such a mode of operation, the LEDs D55-D56 are bypassed and do not contribute to the load on the current and voltage applied to the light source 902. To decrease the voltage being applied to each of the LEDs D5-D53, the control circuit 906 may turn switch Q15 OFF in the open position and turn switch Q16 ON in the closed position so that current flows from the LED D55 to ground, bypassing only the LED D56. Accordingly, the same voltage that was previously applied across the LEDs D5-D54 is applied across the LEDs D5-D55, thereby decreasing the voltage drop across each of the LEDs D5-D54.

Alternatively, the control circuit 906 may increase the voltage being applied to each of the LEDs D5-D53 by turning switch Q15 OFF and by turning switch Q14 on so that current flows from the LED D53 to ground, bypassing the LEDs D54-D56. This change in configuration decreases the overall number of LEDs across which the input voltage must drop and thereby increases the voltage being applied to each of the LEDs D5-D53.

While only four switches Q13-Q16 are illustrated, the control circuit 906 may be configured to control as many switches as there are LEDs, with each switch being connected between an anode terminal of each respective LED and ground.

The control circuit 906 may regulate the current and voltage applied to the LEDs D5-D56 based upon sensing an operational parameter of an input power. The operational parameter sensed by the control circuit 906 may be the current value of the input power in one embodiment or the voltage value of the input power in another embodiment. Alternatively, the control circuit 906 may sense both the current value and voltage value of the input power. The control circuit 906 may sense the input power from the output of the AC conditioning circuit 106 via connection 908. Alternatively, the control circuit 906 may sense the input power directly from the power source 104 or from an input terminal of the light source 902.

In one embodiment, the control circuit 906 may employ an analog to digital converter (ADC) to convert a sensed voltage to an output for controlling the switches Q13-Q16. Alternatively, the control circuit may employ one or more analog controllers such as comparator circuits to control the switches Q13-Q16.

In one embodiment, the control circuit 906 may comprise a semiconductor integrated circuit (e.g., a processor). In another embodiment, the control circuit 906 and the switches Q13-Q16 may be integral parts of a processor. In yet another embodiment, the control circuit 906, the switches Q13-Q16, and the LEDs D5-D56 may be integral parts of a processor.

Each of the plurality of switches Q13-Q16 may be electrically coupled across a respective LED D5-D56 to ground. There may be tens or dozens of LEDs and only four switches, with the switches being interleaved between groups of LEDs. Alternatively, there may be one switch for each of the plurality of LEDs D5-D56. Only four switches Q13-Q16 are shown in FIG. 9 for simplicity and to avoid unnecessarily obscuring the figure.

Each of the switches Q13-Q16 may be a solid-state switch. For example, each of the switches Q13-Q16 may be a transistor, such as, for instance, an insulated-gate bipolar transistor (IGBT), a metal-oxide-semiconductor field-effect transistor (MOSFET) or a bipolar junction transistor (BJT). Typically, when a transistor is activated, the transistor conducts current; when the transistor is deactivated, no current flows through the transistor. Thus, when a switch Q13-Q16 is activated, the switch Q13-Q16 conducts current by creating a path of relatively minimal resistance and thereby electrically shorting the respective LEDs that are downstream of the connection to ground.

The specific values, such as voltages, used herein are purely illustrative, and are not meant to be in anyway limiting on the scope unless expressly recited in the claim(s). Likewise, the arrangements and topologies are merely illustrative and other arrangements and topologies may be employed where consistent with the teachings herein. While specific circuit structures are disclosed, other arrangements that achieve similar functionality may be employed.

The methods illustrated and described herein may include additional acts and/or may omit some acts. The methods illustrated and described herein may perform the acts in a different order. Some of the acts may be performed sequentially, while some acts may be performed concurrently with other acts. Some acts may be merged into a single act through the use of appropriate circuitry.

The various embodiments described above can be combined to provide further embodiments.

To the extent that they are not inconsistent with the teachings herein, the teachings of: U.S. provisional patent application Ser. No. 61/052,924 filed May 13, 2008; U.S. patent application Ser. No. 12/437,467 filed May 7, 2009 and published as U.S. patent application Publication No. 2009-

0284155; U.S. provisional patent application Ser. No. 61/051,619 filed May 8, 2008; U.S. patent application Ser. No. 12/437,472 filed May 7, 2009 and published as U.S. patent application Publication No. 2009-0278474; U.S. provisional patent application Ser. No. 61/088,651 filed Aug. 13, 2008; U.S. patent application Ser. No. 12/540,250 filed Aug. 12, 2009 and published as U.S. patent application Publication No. 2010-0090577; U.S. provisional patent application Ser. No. 61/115,438 filed Nov. 17, 2008; U.S. provisional patent application Ser. No. 61/154,619 filed Feb. 23, 2009; U.S. patent application Ser. No. 12/619,535 filed Nov. 16, 2008 and published as U.S. patent application Publication No. 2010-0123403; U.S. provisional patent application Ser. No. 61/174,913 filed May 1, 2009(0.406P1); U.S. patent application Ser. No. 12/769,956 filed Apr. 29, 2010 and published as U.S. patent application Publication No. 2010-0277082; U.S. provisional patent application Ser. No. 61/180,017 filed May 20, 2009, U.S. patent application Ser. No. 12/784,080 filed May 2010 and published as U.S. patent application Publication No. 2010-0295946; U.S. provisional patent application Ser. No. 61/229,435 filed Jul. 29, 2009; U.S. patent application Ser. No. 12/846,516 filed Jul. 29, 2010 and published as U.S. patent application Publication No. 2011-0026264; U.S. provisional patent application Ser. No. 61/295,519 filed Jan. 15, 2010; U.S. provisional patent application Ser. No. 61/406,490 filed Oct. 25, 2010; U.S. patent application Ser. No. 13/007,080 filed Jan. 14, 2011; U.S. provisional patent application Ser. No. 61/333,983 filed May 12, 2010; U.S. patent application Ser. No. 12/784,091 filed May 20, 2010 and published as U.S. patent application Publication No. 2011-0295454; U.S. provisional patent application Ser. No. 61/346,263 filed May 19, 2010; U.S. patent application Ser. No. 12/784,093 filed May 20, 2010; U.S. patent application Ser. No. 13/166,626 filed Jun. 22, 2011; U.S. patent application Ser. No. 13/085,301 filed Apr. 12, 2011; and U.S. patent application Ser. No. 13/212,074 filed Aug. 17, 2011 are each incorporated herein by reference in their entirety.

Aspects of the embodiments can be modified, if necessary to employ concepts of the various patents, applications and publications to provide yet further embodiments. For example, the structures and/or methods taught herein may be advantageously employed as an input to the structures taught in the U.S. patent application Publication No. 2010-0123403.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A flicker control circuit for use with solid state lighting, comprising:
 a passive alternating current conditioner circuit that converts an alternating current input signal having a first frequency to an output signal having a second frequency that is greater than the first frequency of the alternating current input signal; and
 a passive resonating circuit coupled to the passive alternating current conditioner to multiply the second frequency of the output signal to a multiplied frequency that is sufficiently high that a flicker from a plurality of solid state light sources powered by the output signal is undetectable by an unaided human eye.

2. The circuit of claim 1 wherein the passive resonating circuit includes a number of passive electrical elements operable to increase the frequency of the first output signal.

3. The circuit of claim 2 wherein the number of passive electrical elements are operable to multiply the second frequency of the output signal by four to six times greater than the first frequency of the alternating current input signal.

4. The circuit of claim 2 wherein the number of passive electrical elements include at least one inductor and at least one capacitor.

5. The circuit of claim 4 wherein the at least one inductor and the at least one capacitor are coupled together electrically in series and one of the at least one inductor and the at least one capacitor is connected to a first node between the passive alternating current conditioner circuit and the passive resonating circuit.

6. The circuit of claim 5 wherein the at least one inductor is connected to the first node and the at least one capacitor is connected to a voltage reference.

7. The circuit of claim 5 wherein the at least one inductor has an inductance of approximately 88 millihenries and the at least one capacitor has a capacitance of approximately 20 microfarads.

8. The circuit of claim 4 wherein the at least one inductor includes a first inductor and a second inductor and the at least one capacitor includes a first capacitor and a second capacitor, the first inductor being coupled between the first capacitor and a first node that is between the passive alternating current conditioner circuit and the passive resonating circuit, the first capacitor being coupled between the first inductor and a second node, the second inductor being coupled between the first node and the second node, the second capacitor being coupled to the second inductor and the first capacitor at the second node.

9. The circuit of claim 8 wherein the second capacitor is coupled between the second node and a voltage reference.

10. The circuit of claim 8 wherein the second frequency of the output signal is at least six times greater than the first frequency of the alternating current input signal.

11. The circuit of claim 8 wherein the first inductor has an inductance that is approximately the same value as an inductance of the second inductor.

12. The circuit of claim 8 wherein a current supplied to the plurality of solid state light sources from the first node is positive while the alternating current input signal is received by the flicker control circuit.

13. The circuit of claim 8 wherein the first capacitor has a capacitance of approximately 20 microfarads.

14. The circuit of claim 13 wherein the second capacitor has a capacitance that is greater than 8 times the capacitance of the first capacitor.

15. The circuit of claim 4, further comprising:
 a first diode electrically coupled in series to a second diode, the first diode and the second diode coupled between a first node and a second node, wherein the at least one capacitor includes a first capacitor and a second capacitor, the first capacitor coupled between the first node and the second node, and the at least one inductor coupled between the first node and the second node.

16. The circuit of claim 15 wherein a cathode terminal of the first diode is connected to the first node, an anode terminal of the first diode is connected to an anode terminal of the second diode and a cathode terminal of the second diode is connected to the second node, wherein the second capacitor is coupled between the second node and a voltage reference.

17. The circuit of claim 1, further comprising:
the plurality of solid state light sources are at least partially electrically coupled in series to one another and are configured to receive the output signal from the passive alternating current conditioning circuit.

18. A flicker control circuit for an alternating current lighting system employing solid state light sources, comprising:
a diode rectifier circuit operable to receive an alternating current signal and provide a rectified current signal to a first node to provide power to a plurality of solid state light sources; and
a passive signal conditioning resonant circuit electrically coupled to the first node and operable to increase a frequency of the rectified current signal at the first node to control a detectible flicker from the plurality of solid state light sources while providing a power factor in excess of 0.8.

19. The system of claim 18 wherein the passive signal conditioning resonant circuit is operable to at least double the frequency of the rectified current signal at the first node.

20. The system of claim 18 wherein the plurality of solid state light sources are electrically coupled in series to each other and at least one of the plurality of solid state light sources is coupled to the first node.

21. The system of claim 18 wherein the plurality of solid state light sources are light emitting diodes.

22. The system of claim 18 wherein the passive signal conditioning resonant circuit consists of a number of passive electrical components comprising at least one inductor and at least one capacitor configured to resonate at a desired frequency to increase the frequency of the rectified current signal.

23. The system of claim 22 wherein the desired frequency is 120 hertz.

24. The system of claim 22 wherein the desired frequency is 100 hertz.

25. The system of claim 22 wherein the at least one inductor is coupled in electrical series with the at least one capacitor and the at least one inductor and the at least one capacitor are coupled between the first node and a voltage reference.

26. The system of claim 22 wherein the at least one inductor includes a first inductor and a second inductor and the at least one capacitor includes a first capacitor and a second capacitor, the first inductor being coupled between the first node and the first capacitor, the first capacitor being coupled between the first inductor and a second node, the second inductor being coupled between the first node and the second node, the second capacitor being coupled between the second node and a ground reference.

27. The system of claim 26 wherein the first capacitor has a capacitance that is less than $1/8$ of a capacitance of the second capacitor.

28. The system of claim 22 wherein the passive conditioning resonant circuit further comprises:
a first diode connected in electrical series to a second diode, the at least one capacitor including a first capacitor and a second capacitor, the first and second diodes connected electrically in parallel to the first capacitor and to the at least one inductor between a first node and a second node.

29. The system of claim 28 wherein the second capacitor is coupled between the second node and a ground reference and the first and second diodes are zener diodes.

30. A method of operating a string of a plurality of solid state light sources without an active switch, comprising:
receiving an alternating current signal at an input terminal;
rectifying the alternating current signal with a rectifier bridge and providing a rectified current signal to a first node, the rectified current signal having a frequency that is approximately double a frequency of the alternating current signal;
increasing the frequency of the rectified current signal with a resonant network including passive electrical elements to reduce the detectability of amplitude variations in the rectified current signal by an unaided human eye as emitted by the plurality of solid state light sources; and
providing the rectified current signal to the string of the plurality of solid state light sources to forward bias the plurality of solid state light sources.

31. The method of claim 30 wherein receiving the alternating current signal includes receiving the alternating current signal at a frequency of 120 hertz.

32. The method of claim 30 wherein receiving includes receiving the alternating current signal at a frequency of 100 hertz.

33. The method of claim 30 wherein increasing the frequency of the rectified current signal includes increasing the frequency to 200-260 hertz.

34. The method of claim 30 wherein increasing the frequency of the rectified current signal includes increasing the frequency to 320-380 hertz.

* * * * *

UNITED STATES PATENT AND TRADEMARK OFFICE
CERTIFICATE OF CORRECTION

PATENT NO. : 8,629,621 B2  
APPLICATION NO. : 13/592590  
DATED : January 14, 2014  
INVENTOR(S) : William G. Reed Page 1 of 1

It is certified that error appears in the above-identified patent and that said Letters Patent is hereby corrected as shown below:

On the Title Page

Item (56) Page 2, Column 2, under Foreign Patent Documents, line 10:
"WO 2007/0365873 A2 4/2007" should read, --WO 2007/036873 A2 4/2007--.

Item (56) Page 2, Column 2, under Other Publications, line 24:
""LCD Backlight I/O Ports and Power Protection Circuit Design," dated May 2, 2011, retrieved Jun. 10, 2011, retrieved from http://www.chipoy.info/gadgets/lcd-backlight-i-o-ports-and-powerpr..., 4 pages" should read, --"LCD Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr..., 4 pages--.

Signed and Sealed this
Twenty-fourth Day of June, 2014

Michelle K. Lee
*Deputy Director of the United States Patent and Trademark Office*